US007390952B2

(12) United States Patent
Hasegawa

(10) Patent No.: US 7,390,952 B2
(45) Date of Patent: Jun. 24, 2008

(54) ELECTRONIC MUSIC APPARATUS SYSTEM USEFUL FOR USER REGISTRATION

(75) Inventor: Yutaka Hasegawa, Hamamatsu (JP)

(73) Assignee: Yamaha Corporation, Shizuoka-Ken (JP)

( * ) Notice: Subject to any disclaimer, the term of this patent is extended or adjusted under 35 U.S.C. 154(b) by 0 days.

(21) Appl. No.: 10/251,024

(22) Filed: Sep. 20, 2002

(65) Prior Publication Data

US 2003/0056637 A1 Mar. 27, 2003

(30) Foreign Application Priority Data

Sep. 21, 2001 (JP) ............................ 2001-288708

(51) Int. Cl.
*G10H 1/00* (2006.01)
*H04K 1/00* (2006.01)
*H04L 9/00* (2006.01)

(52) U.S. Cl. .......................................... 84/600; 705/56

(58) Field of Classification Search .................. 84/609, 84/600, 615; 705/56

See application file for complete search history.

(56) References Cited

U.S. PATENT DOCUMENTS 5,616,879 A 4/1997 Yamauchi et al.
5,880,386 A 3/1999 Wachi et al.
5,963,916 A * 10/1999 Kaplan ........................ 705/26
5,991,374 A * 11/1999 Hazenfield ............. 379/101.01
6,175,872 B1 * 1/2001 Neumann et al. ........... 709/231
6,385,596 B1 * 5/2002 Wiser et al. .................... 705/51
6,560,651 B2 * 5/2003 Katz et al. .................. 709/229
6,571,339 B1 * 5/2003 Danneels et al. ............ 713/201
6,594,692 B1 * 7/2003 Reisman ..................... 709/219
6,820,063 B1 * 11/2004 England et al. ............... 705/54
6,950,941 B1 * 9/2005 Lee et al. .................... 713/193
7,189,911 B2 * 3/2007 Isozaki ........................ 84/609
2002/0059120 A1 * 5/2002 Milton ........................ 705/28
2002/0065732 A1 * 5/2002 Rodgers et al. ............... 705/26
2002/0095543 A1 * 7/2002 Shioda et al. .................. 711/1
2002/0152278 A1 * 10/2002 Pontenzone et al. ......... 709/217
2002/0156802 A1 * 10/2002 Takayama et al. ........... 707/500
2004/0015249 A1 * 1/2004 Izumi et al. ................... 700/94
2004/0125957 A1 * 7/2004 Rauber et al. ............... 380/259

FOREIGN PATENT DOCUMENTS

EP 0777208 A1 6/1997
JP 9-152986 6/1997
JP 2000-102072 4/2000
JP 2000-332823 11/2000
WO WO 01/16931 A1 3/2001

OTHER PUBLICATIONS

European Search Report No. EP 02020570 dated Dec. 23, 2002.
Decision of Rejection issued Jan. 24, 2006 by Japan Patent Office on corresponding application JP 2001-288708.

* cited by examiner

*Primary Examiner*—Jeffrey Donels
(74) *Attorney, Agent, or Firm*—Harness, Dickey & Pierce, PLC

(57) ABSTRACT

In an electronic music apparatus system, a unique musical instrument ID is stored in an electronic musical instrument by means of a plant computer before shipment thereof. After purchase of the electronic musical instrument, a user transmits the stored musical instrument ID to a management computer via a network without use of any intermediate device or by use of a user computer or a user portable communication terminal and performs user registration. By use of the musical instrument ID, the user downloads a program or content item suitable for the electronic musical instrument from a program distribution computer or a contents distribution computer via the network.

22 Claims, 10 Drawing Sheets

FIG.3

| | |
|---|---|
| MUSICAL INSTRUMENT ID | 000001 |
| PRODUCT MODEL NUMBER | AB-100 |
| OS VERSION | 1.00 |
| FUNCTION 1 VERSION | 1.00 |
| FUNCTION 2 VERSION | 1.00 |
| . | . |
| . | . |
| SHIPMENT DATE | 2001/4/1 |
| PLANT NAME | PLANT A |
| DESTINATION | JAPAN |
| USER NAME | SUZUKI··· |
| ADDRESS | TOKYO··· |
| PHONE NUMBER | 03-··· |
| ELECTRONIC MAIL | suzuki@··· |
| : | : |
| IP ADDRESS | 192. ··· |

MUSICAL-INSTRUMENT-SPECIFIC DATA

USER-SPECIFIC DATA

ELECTRONIC MUSIC APPARATUS SYSTEM USEFUL FOR USER REGISTRATION

BACKGROUND OF THE INVENTION

1. Field of the Invention

The present invention relates to an electronic music apparatus system which includes a management computer connected to a network and is adapted to manage electronic music apparatuses connected to the network, and more particularly to an electronic music apparatus system which manages distribution of programs, contents, etc. from a distribution computer to electronic music apparatuses. Moreover, the present invention relates to an electronic music apparatus, a management computer, a user computer, and a distribution computer used in the electronic music apparatus system, as well as to programs for the apparatus and computers.

2. Description of the Related Art

Conventionally, when an electronic music apparatus such as an electronic musical instrument is manufactured, a label on which a unique identification number such as a serial number has been printed is affixed thereto, and a registration post card on which the unique identification number has been printed is placed in a packing carton for the electronic music apparatus. A user writes his name and address, etc. on the registration post card and sends it back to the manufacturer for the purpose of user registration. In recent years, a user can perform user registration on a web site of the manufacture by inputting a unique identification number such as a serial number.

However, in the case where registration post cards are used, users must send registration post cards to the manufacturer by mail, which is very bothersome for the users, and therefore, some users fail to perform user registration. Further, even in the case of user registration being performed on a web site, users must input unique identification numbers, which is somewhat time-consuming, and some users may input erroneous identification numbers.

SUMMARY OF THE INVENTION

The present invention has been conceived in order to cope with the above-described problems, and an object of the present invention is to provide an electronic music apparatus system which enables simple and accurate user registration.

Another object of the present invention is to provide an electronic music apparatus system which can properly distribute to an electronic music apparatus a program or contents suitable for the electronic music apparatus.

Still another object of the present invention is to provide an electronic music apparatus, a management computer, a user computer, and a distribution computer used in the electronic music apparatus system, as well as programs for the apparatus and computers.

The present invention, which achieves the above-described objects, is characterized in that an electronic music apparatus is communicatably connected to a management computer via a network; identification data unique to the electronic music apparatus are stored in advance; and the unique identification data are transmitted to the management computer via the network in order to register a user of the electronic music apparatus.

The electronic music apparatus may be any type of electronic music apparatus, such as an electronic music apparatus capable of generating tone signals and an electronic music apparatus capable of imparting musical effects to tone signals. Examples of such electronic music apparatuses include keyboard-type electronic musical instruments; electronic musical instruments having playing controllers other than keyboards; tone signal generators not equipped with playing controllers; sequencers (automatic playing units); samplers; apparatuses capable of generating tone signals such as karaoke apparatuses and personal computers having tone signal generators; and apparatuses capable of imparting musical effects to tone signals such as mixers, recorders, and effectors. The unique identification data may be stored in a memory unit of the electronic music apparatus at a manufacturing plant before shipment thereof.

The unique identification data may be transmitted from the electronic music apparatus to the management computer by the following methods. In a first method, a user computer (personal computer) is connected between the electronic music apparatus and the network and is operated to transmit the unique identification data to the management computer. In a second method, transmission of the unique identification data from the electronic music apparatus to the network is effected via a portable communication terminal. In a third method, the electronic music apparatus is connected directly to the network and is operated to transmit the unique identification data directly to the management computer.

At the time of user registration, in addition to the identification data, data representing the name, address, phone number, and mailing address of the user are desirably transmitted to the management computer. The management computer is desirably operated to store in a management database user-specific data such as the name, address, phone number, and mailing address of the user, as well as the identification data.

When a user purchases the electronic music apparatus, unique identification data have already been stored in the electronic music apparatus. Since user registration is performed through a simple operation of transmitting the unique identification data to the management computer via the network, the user can perform user registration with ease. Moreover, the user is not required to input the identification data unique to the electronic music apparatus at the time of user registration. Therefore, accidents in which the user transmits erroneous identification data to the management computer can be avoided, and user registration can be performed accurately.

Another feature of the present invention resides in that programs or content items suitable for the electronic music apparatus are distributed to the electronic music apparatus through use of the unique identification data. In this case, examples of such programs include update programs for updating an operating system program and functions programs for realizing various functions of the electronic music apparatus. Examples of contents include contents for electronic music apparatuses consisting of tone waveform data; tone control data such as tone color data and effect data; and automatic play data.

The distribution may be performed as follows. A database for storing many types of programs and contents is disposed in the management computer; and the management computer distributes a program or content item to the electronic music apparatus. Preferably, in response to a request from the electronic music apparatus, which requests a program or content item and is accompanied by the unique identification data, the management computer selects a program or content item that matches the electronic music apparatus among programs and contents stored in the database by use of the unique identification data, and distributes the selected program or content item to the electronic music apparatus.

Alternatively, the distribution may be performed by use of a distribution computer which has a database for storing many types of programs or contents and is connected to the network in order to distribute the programs or contents. Preferably, in response to a request from the electronic music apparatus, which requests a program or content item and is accompanied by the unique identification data, the distribution computer checks the unique identification data registered in the management computer, selects a program or content item that matches the electronic music apparatus among programs and contents stored in the database by use of the unique identification data, and distributes the selected program or content item to the electronic music apparatus.

In this case, the management computer preferably stores apparatus-specific data in its management database. The apparatus-specific data consist of identification data and various data representing the model number of the electronic music apparatus, the version of the OS program, the versions of functions programs for realizing various functions, shipment date, the name of a plant at which the electronic music apparatus was manufactured, and the destination. When the management computer distributes a program or content item or when the distribution computer distributes a program or content item, a program or content item that matches the user's electronic music apparatus is distributed with reference to the apparatus-specific data.

By virtue of the above feature, a program or content item that matches the user's electronic music apparatus can be distributed to the electronic music apparatus without fail, and an accident in which an improper program or content item is distributed to the electronic music apparatus can be avoided.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 3 is a diagram showing an example data format of management data;

DESCRIPTION OF THE PREFERRED EMBODIMENT

Figure 1:
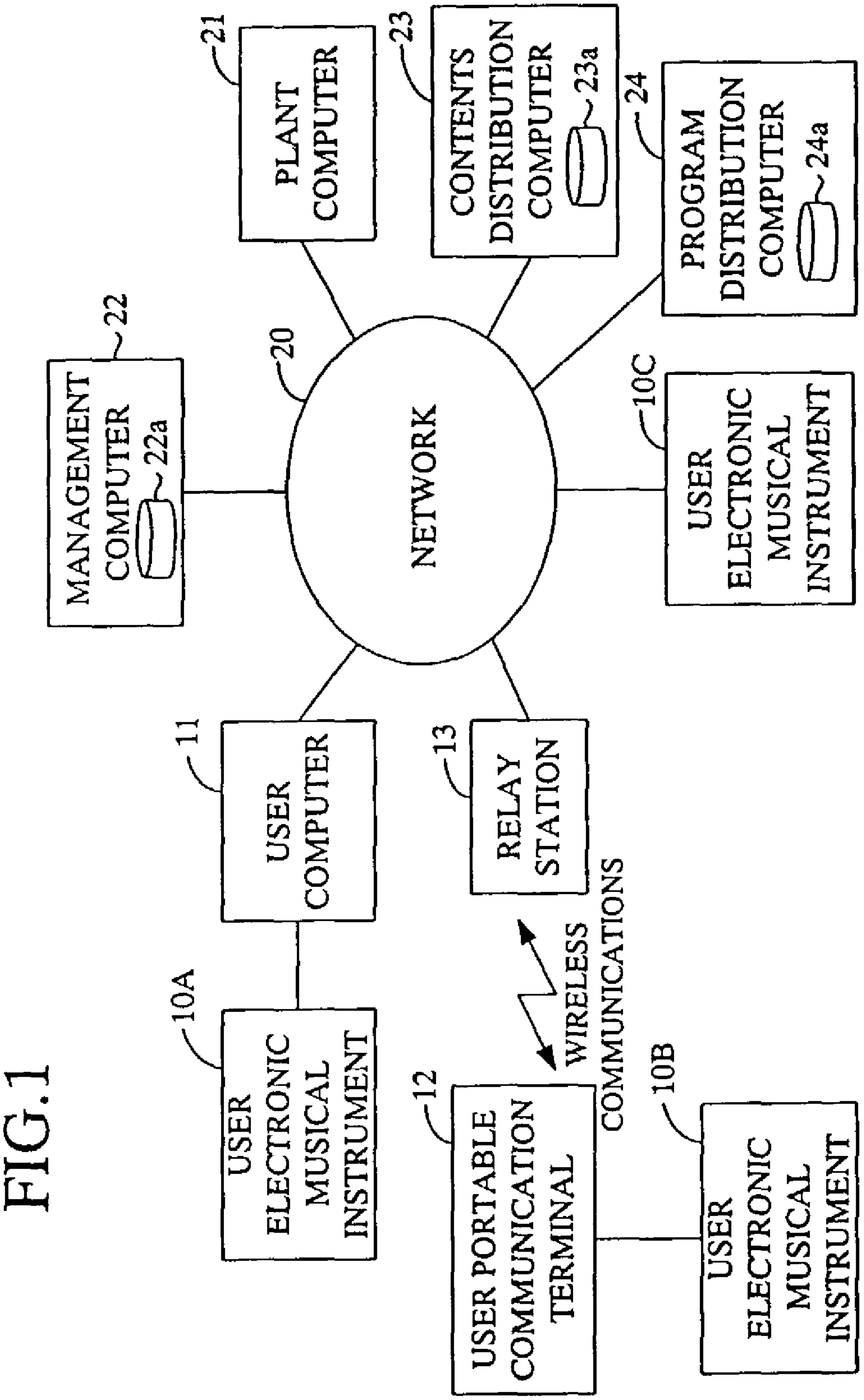
FIG. 1 is an overall schematic diagram of an electronic music apparatus system according to an embodiment of the present invention.

A preferred embodiment of the present invention will be described with reference to the drawings. FIG. 1 schematically shows the overall configuration of an electronic music apparatus system according to the embodiment.

The system of FIG. 1 includes user electronic musical instruments 10A, 10B, and 10C, each serving as an electronic music apparatus. The user electronic musical instrument 10A is communicatably connected to a network 20 such as the Internet via a user computer 11. The user computer 11 is an ordinary personal computer consisting of a CPU, ROM, RAM, a recording unit, a communication interface, etc. and is connected to each of the user electronic musical instrument 10A and the network 20 via a wired or wireless line. The user electronic musical instrument 10B is communicatably connected to the network 20 via a user portable communication terminal 12 and a relay station 13. Like a cellular phone, the user portable communication terminal 12 has a function for exchanging (i.e., transmitting and receiving) data in a wireless manner with the relay station 13, which is remote from the user portable communication terminal 12, and is connected to the user electronic musical instrument 10B via a wired or wireless line. The relay station 13 has a function for exchanging (i.e., transmitting and receiving) data in a wireless manner with the user portable communication terminal 12, which is remote from the relay station 13, and is connected to the network 20 via a wired or wireless line. The user electronic musical instrument 10C is connected directly to the network 20 via a wired or wireless line.

Notably, these user electronic musical instruments 10A, 10B, and 10C are shown in order to exemplify three types of electronic musical instruments which are used in different fashions. In actuality, a large number of electronic musical instruments are connected to the network 20.

Figure 2:
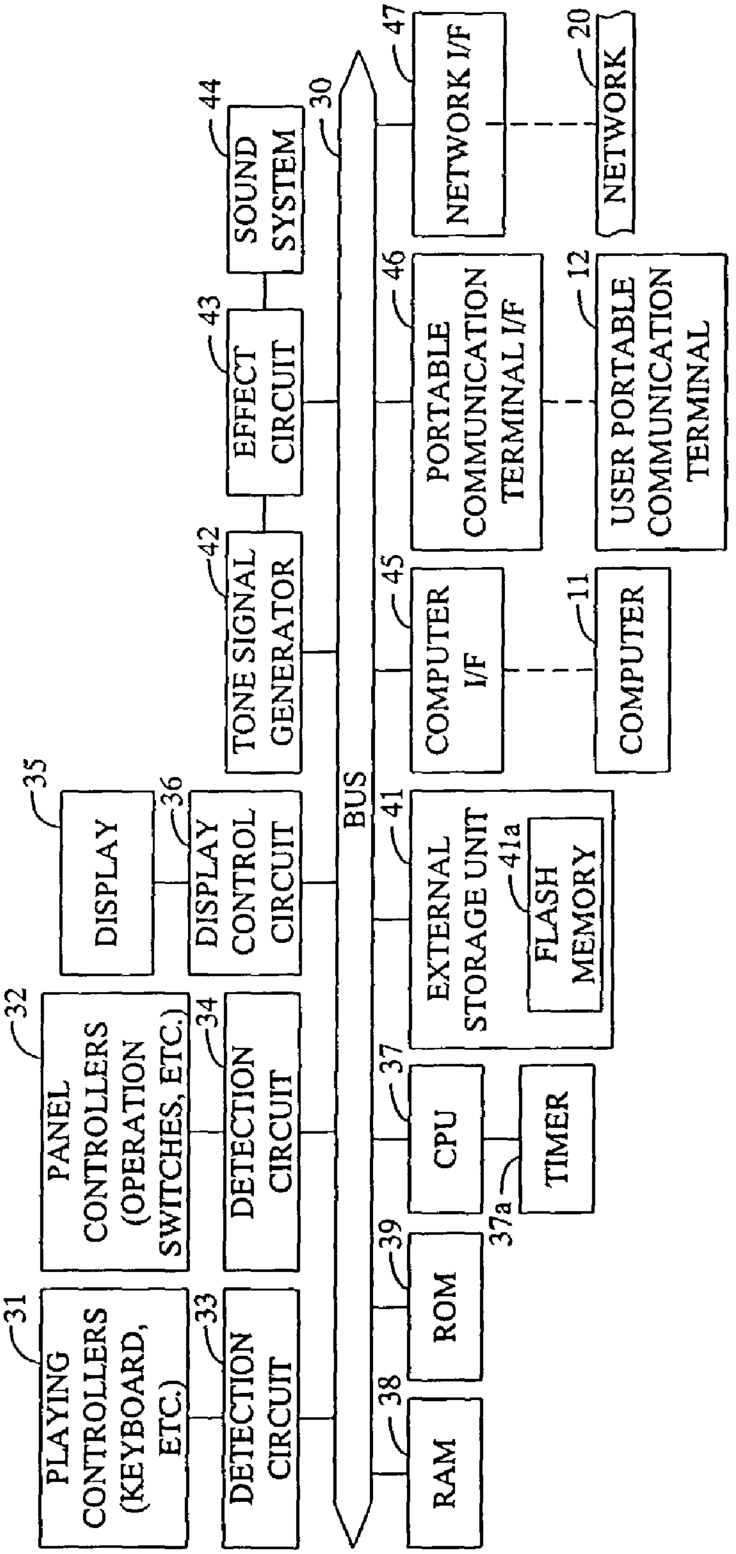
FIG. 2 is a schematic block diagram of the user electronic musical instrument shown in FIG. 1.

As specifically shown in FIG. 2, each of the user electronic musical instruments 10A, 10B, and 10C is equipped with a plurality of playing controllers 31 (e.g., a keyboard consisting of a plurality of keys) for generating tones and a plurality of panel controllers 32 (e.g., operation switches) which are provided on an operation panel and are used to instruct the overall operation of the electronic musical instrument, including designation of the characteristics (e.g., tone color, volume, and effect) of the generated tone and instruction for performing communication with an external unit. Operations of the playing controllers 31 and the panel controllers 32 are detected by means of detection circuits 33 and 34, respectively, which are connected to a bus 30.

A display 35 is also disposed on the operation panel. The display 35 is constituted by a liquid-crystal display panel or a small CRT and is adapted to display letters, numerals, images, etc. The display 35 is controlled by means of a display control circuit 36, which is connected to the bus 30.

Moreover, a CPU 37, RAM 38, ROM 39, and an external storage unit 41, which constitute a computer main body portion, are connected to the bus 30. The CPU 37 executes programs to thereby control various operations of the electronic musical instrument. A timer 37*a* is connected to the CPU 37 in order to measure time and control the execution of programs by the CPU 37. The RAM 38 stores, when necessary, a portion or the entirety of various programs transferred from the external storage unit 41, and temporarily stores variables necessary for execution of the programs. The ROM 39 stores various programs and a portion of tone control data used for controlling generation of tone signals.

The external storage unit 41 is constituted by a recording medium such as a hard disk HD that has been previously installed within the housing of the electronic musical instrument; or a compact disk CD, a flexible disk FD, or a semiconductor memory, which are removably attached to the housing. The external storage unit 41 stores various programs and a portion or the entirety of tone control data used for controlling generation of tone signals. The external storage unit 41 further includes a drive unit which can read programs and data from, or write the same onto, the recording medium such as the hard disk HD, the compact disk CD, or the flexible disk FD. Notably, the external storage unit 41 also stores a program for an operating system (hereinafter referred to as an OS program) and function programs which realize various functions 1, 2, etc. of the electronic musical instrument.

The external storage unit 41 includes a flash memory (EEPROM) 41*a* as well. The flash memory 41*a* stores musical-instrument-specific data regarding the corresponding electronic musical instrument, and an IP address serving as a network address thereof. As shown in FIG. 3, the musical-instrument-specific data consist of musical instrument identification data (hereinafter referred to as a musical instrument ID) for specifying an electronic musical instrument and various data which represent the model number of the product, the version of the OS program (hereinafter referred to as the OS version), the versions of programs for realizing functions 1, 2, etc. (hereinafter referred to as the function 1 version, function 2 version, etc.), shipment date, the name of a plant at which the product was manufactured, and the place of destination. Notably, the musical-instrument-specific data and IP address are not necessarily required to be stored in the flash memory 41*a*. The musical-instrument-specific data and IP address may be stored in a writable recording medium of other type which is contained in the user electronic musical instruments 10A to 10C and which can maintain stored data even when power supply is cut off. In this case, the flash memory 41*a* is replaced with a recording medium of another type.

A tone signal generator 42 and an effect circuit 43 are connected to the bus 30. The tone signal generator 42 generates tone signals on the basis of play data (key-on signal, key-off signal, note number, velocity) supplied via the bus 30. When a tone signal is generated, the conditions of generation of a tone, including tone elements such as tone color and volume (amplitude envelope) of the tone signal, are controlled on the basis of tone control data supplied via the bus 30. The effect circuit 43 imparts various musical effects to the tone signal output from the tone signal generator 42 on the basis of effect control data for musical effects supplied via the bus 30, and then outputs the tone signal. A sound system 44 is connected to the effect circuit 43. The sound system 44 includes amplifiers, speakers, etc., and generates a tone corresponding to the tone signal to which effects have been imparted.

A computer interface circuit 45, a portable communication terminal interface circuit 46, and a network interface circuit 47 are connected to the bus 30. The computer interface circuit 45 enables connection with the above-described user computer 11. The portable communication terminal interface circuit 46 enables connection with the above-described user portable communication terminal 12. The network interface circuit 47 enables connection with the above-described network 20. Accordingly, the user electronic musical instruments 10A to 10C are not required to have all the interface circuits 45 to 47, but each is required to have at least one of these interface circuits. For example, the user electronic musical instrument 10A includes the computer interface circuit 45 only; the user electronic musical instrument 10B includes the portable communication terminal interface circuit 46 only; and the user electronic musical instrument 10C includes the network interface circuit 47 only.

Returning to the description of the system of FIG. 1, a plant computer 21, a management computer 22, a contents distribution computer 23, and a program distribution computer 24 are connected to the network 20. Each of these computers 21 to 24 is constituted by an ordinary server computer or personal computer which includes a CPU, ROM, RAM, a recording unit, a communication interface, and other components.

The plant computer 21 is adapted to write musical-instrument-specific data in the flash memories 41*a* of the user electronic musical instruments 10A to 10C. The management computer 22 controls the entirety of the present system. The management computer 22 has a management database (storage unit) 22*a* for storing management data for each electronic musical instrument as shown in FIG. 3. Each set of management data consists of the above-described musical-instrument-specific data and user-specific data. The user-specific data include the name, address, phone number, and electronic-mail address of a user.

The contents distribution computer 23 is adapted to distribute contents for electronic musical instruments to the user electronic musical instruments 10A to 10C in accordance with requests therefrom. Examples of such contents include tone waveform data; tone control data such as tone color data and effect data; and automatic play data. The contents distribution computer 23 has a contents database (storage unit) 23*a* for storing the contents. Note that the contents database 23*a* stores various contents for electronic musical instruments for combinations of types and model names of electronic musical instruments. The program distribution computer 24 is adapted to distribute to the user electronic musical instruments 10A to 10C, in accordance with requests therefrom, update programs for updating various programs such as function programs and OS programs for controlling the operations of the user electronic musical instruments 10A to 10C. The program distribution computer 24 has a program database 24*a* for storing the update programs. Noted that the program database 24*a* stores various update programs for combinations of types and model names of electronic musical instruments.

Next, operation of the electronic music apparatus system according to the embodiment having the above-described configuration will be described with reference to flowcharts.

First, there will be described an operation for recording music-instrument-specific data in a newly manufactured electronic musical instrument before shipment thereof. Every time a new electronic musical instrument is manufactured, a worker at the manufacturing plant causes the plant computer 21 to execute a musical-instrument-specific data writing program shown in FIG. 4. The plant computer 21 starts this program from step F10, and in step F11 transmits a new music instrument ID request command to the management computer 22.

Figure 4:
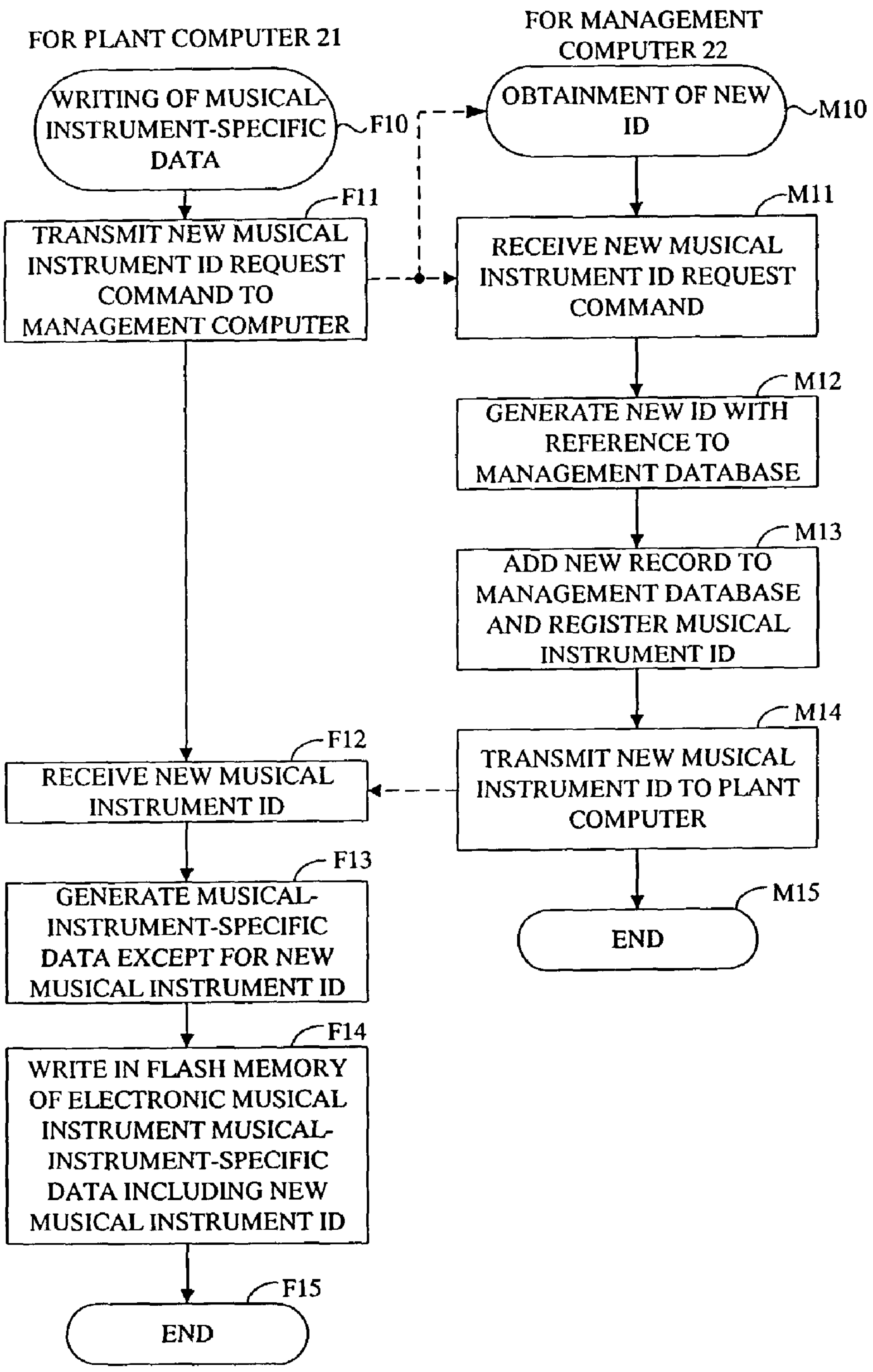
FIG. 4 is a flowchart showing a musical-instrument-specific data writing program executed by the plant computer and a new ID obtaining program executed by the management computer.

In response to the new music instrument ID request command, the management computer 22 starts a new ID obtaining program shown FIG. 4 from step M10, and in step M11, the management computer 22 receives the new music instrument ID request command. In subsequent step M12, with reference to the management database 22*a* the management computer 22 generates a new musical instrument ID (e.g., serial number data) which differs from the registered musical instrument IDs. In subsequent step M13, the management computer 22 adds a new record to the management database 22*a*; i.e., reserves a record area for storing management data for the new electronic musical instrument, and registers (stores) the generated new musical instrument ID in the record. In step M14, the management computer 22 transmits the new musical instrument ID to the plant computer 21, and in step M15 the management computer 22 ends the new ID obtaining program.

Meanwhile, in step F12 the plant computer 21 receives the new musical instrument ID transmitted from the management computer 22, and in step F13 the plant computer 21 generates musical-instrument-specific data, except for the new musical instrument ID, the data consisting of various data representing the model number of the product, the OS version, the function 1 version, the function 2 version, etc., shipment date, the plant name, and the destination. The generation of the musical-instrument-specific data is performed through manual input of the data by a worker at the plant or through direct use of data which are stored in an unillustrated manufacture management computer for the purpose of managing production of electronic musical instruments. After completion of the processing in step F13, in step F14 the plant computer 21 writes the musical-instrument-specific data, including the received new musical instrument ID (see FIG. 3), in the flash memory 41*a* of the manufactured electronic musical instrument. In subsequent step F15, the plant computer 21 ends the musical-instrument-specific data writing program. Notably, the present invention is not limited to the case in which a new musical instrument ID is generated in the management computer 22. The embodiment may be modified in such a manner that a new musical instrument ID is generated in the plant computer 21 and written in the flash memory 41*a* of the manufactured electronic musical instrument, and the new musical instrument ID is then transmitted to the management computer 22 and registered in the management database 22*a* of the management computer 22.

Next, there will be described an operation which is performed after a user has purchased an electronic musical instrument, in order to register user information in the management database 22*a* by use of the user computer 11. That is, user registration in relation to the user electronic musical instrument 10A of FIG. 1 will be described.

Figure 5:
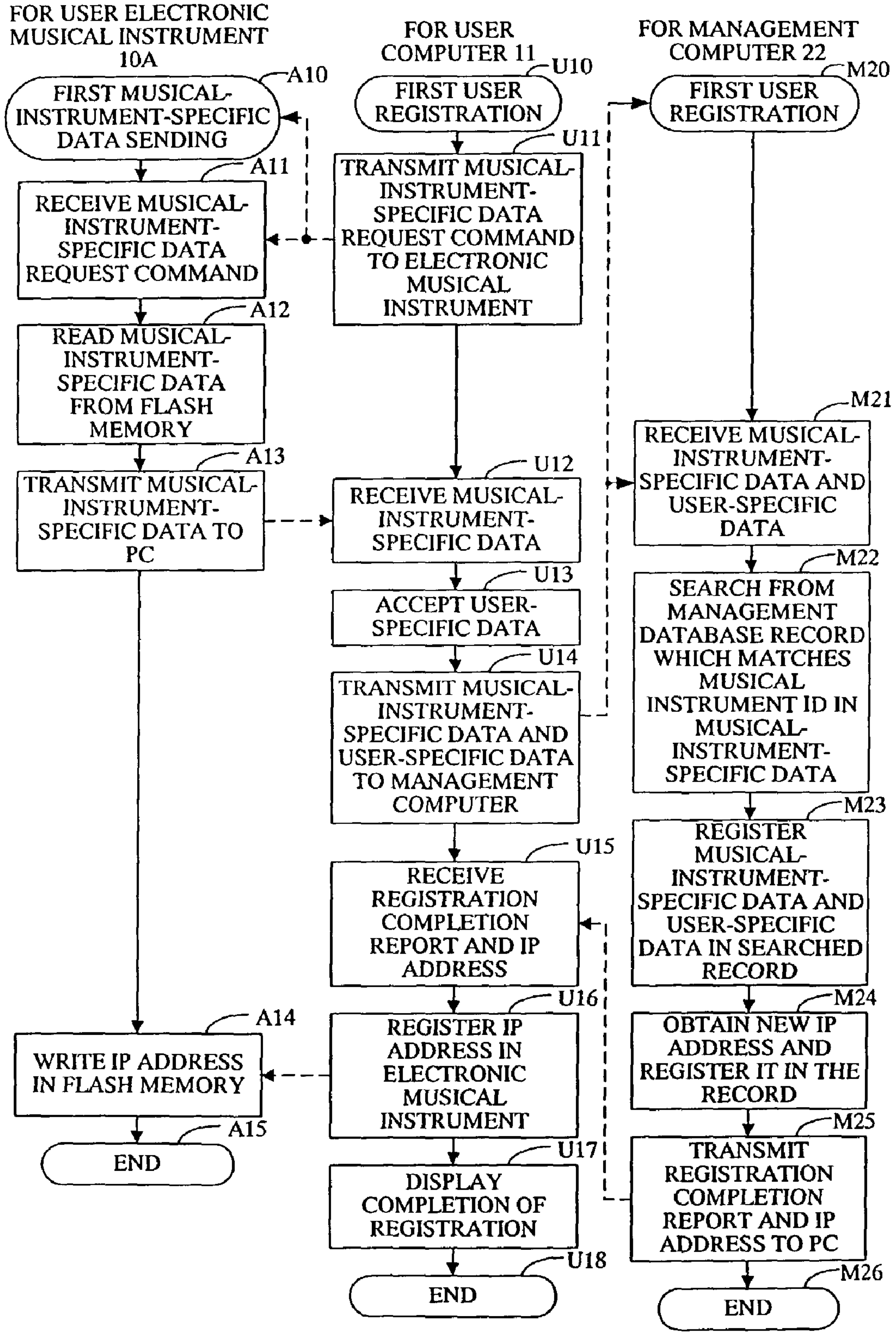
FIG. 5 is a flowchart showing a first musical-instrument-specific data sending program executed by the user electronic musical instrument, a first user registration program executed by the user computer, and a first user registration program executed by the management computer.

In this case, the user causes the user computer 11 to execute a corresponding first user registration program shown in FIG. 5. After start of the first user registration program from step U10, in step U11 the user computer 11 transmits a musical-instrument-specific data request command to the user electronic musical instrument 10A.

In response to transmission of the musical-instrument-specific data request command, the user electronic musical instrument 10A starts a first musical-instrument-specific data sending program from step A10, and in step A11 receives the musical-instrument-specific data request command. Specifically, the program for the user electronic musical instrument 10A is executed by the CPU 37 contained in the user electronic musical instrument 10A. However, in order to simplify description, the program is considered to be executed by the user electronic musical instrument 10A in the following description. Subsequently, the user electronic musical instrument 10A reads musical-instrument-specific data from the flash memory 41*a* in step A12 and in step A13 transmits the read musical-instrument-specific data to the user computer 11.

Meanwhile, the user computer 11 receives the transmitted musical-instrument-specific data in step U12 and in step U13 accepts user-specific data. While viewing the display of the user computer 11, the user operates the keyboard in order to input user-specific data consisting of the name, address, phone number, and electronic-mail address of the user. In step U14, the user computer 11 transmits the received musical-instrument-specific data and the input user-specific data to the management computer 22.

In response to transmission of the musical-instrument-specific data and the user-specific data, the management computer 22 starts a corresponding first user registration program from step M20, and in step M21 receives the musical-instrument-specific data and the user-specific data. In subsequent step M22, the management computer 22 searches from the management database 22*a* a record whose musical instrument ID matches that contained in the musical-instrument-specific data. In step M23, the management computer 22 registers the received musical-instrument-specific data and user-specific data in the searched record.

After completion of the processing in step M23, the management computer 22 obtains a new IP address and registers it in the record in step M24, and in step M25 transmits a user registration completion report and the IP address to the user computer 11. Notably, IP addresses are not managed by the management computer 22 but are managed by an IP address management computer (not shown) owned by an IP address management organization. The management computer 22 requests the IP address management computer to issue a new IP address. In response thereto, the IP address management computer generates a new IP address and transmits it to the management computer 22. The management computer 22 receives the transmitted new IP address. In step M26, the management computer 22 ends the first user registration program.

Meanwhile, in step U15 the user computer 11 receives the transmitted user registration completion report and IP address. Subsequently, in step U16 the user computer 11 transmits the received IP address to the user electronic musical instrument 10A, and in step U17 the user computer 11 displays completion of registration of the IP address on the display. In step U18, the user computer 11 ends the first user registration program.

Meanwhile, in step A14 the user electronic musical instrument 10A receives the transmitted IP address and writes it in the flash memory 41*a*. In subsequent step A15, the user electronic musical instrument 10A ends the first musical-instrument-specific data sending program.

As described above, when the user purchases the user electronic musical instrument 10A, a corresponding musical instrument ID, serving as unique identification data, has already been stored in the flash memory 41*a* of the user electronic musical instrument 10A. Therefore, for user registration, the user is required only to transmit to the management computer 22 the user-specific data together with the stored musical-instrument-specific data, including the musical instrument ID, by use of the user computer 11 and is not required to input the musical-instrument-specific data, including the musical instrument ID. Therefore, user registration can be performed simply. Moreover, an accident in which the user transmits musical-instrument-specific data containing an erroneous musical instrument ID to the management computer 22 can be avoided, and user registration can be performed accurately.

Next, there will be described an operation in which the user updates the OS program or the function programs of the user electronic musical instrument 10A by use of the user computer 11.

Figure 6:
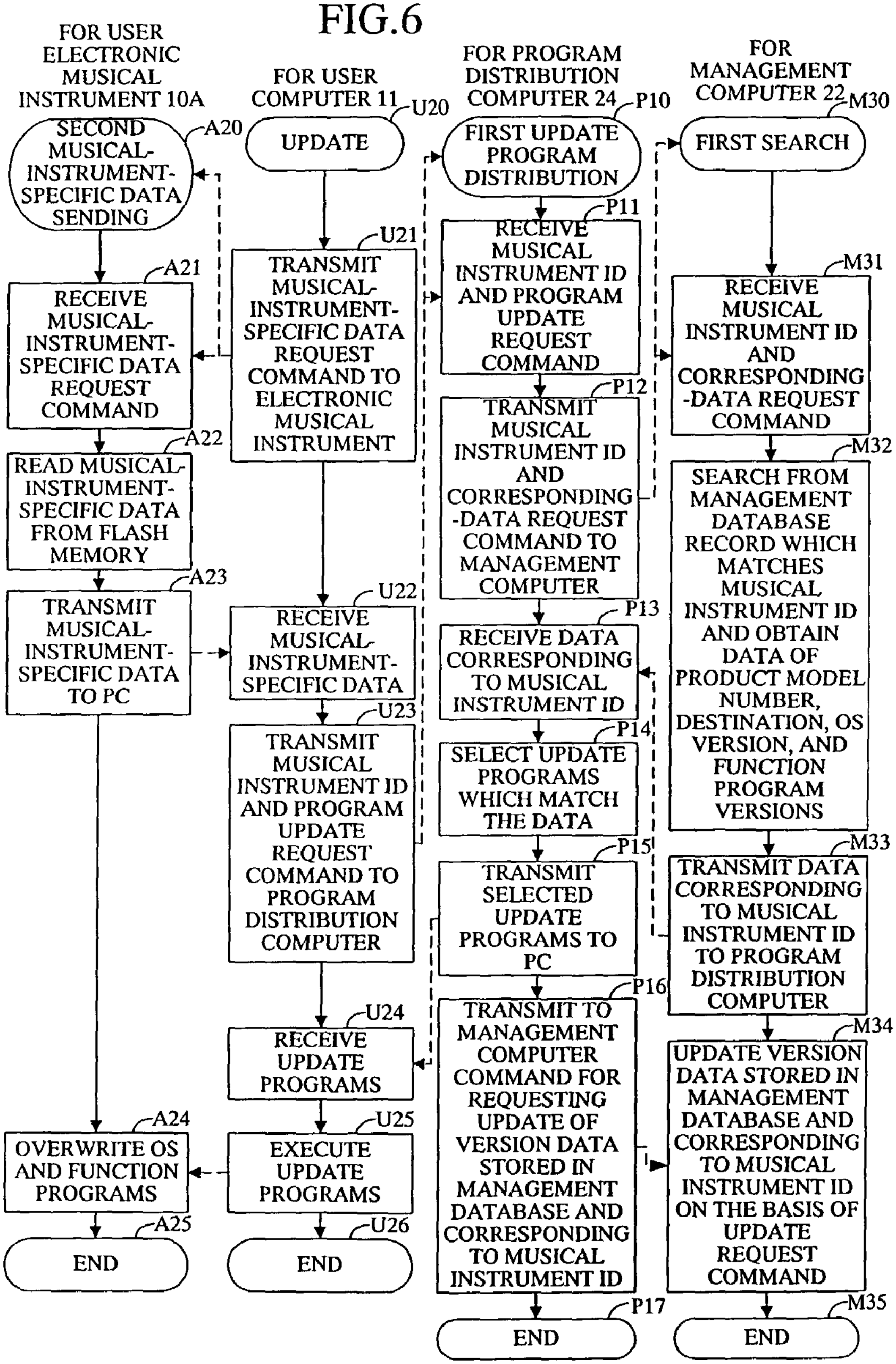
FIG. 6 is a flowchart showing a second musical-instrument-specific data sending program executed by the user electronic musical instrument, an update program executed by the user computer, a first update program distribution program executed by the program distribution computer, and a first search program executed by the management computer.

In this case, the user causes the user computer 11 to execute an update program shown in FIG. 6. After start of the update program from step U20, in step U21 the user computer 11 transmits a musical-instrument-specific data request command to the user electronic musical instrument 10A.

In response to the musical-instrument-specific data request command, the user electronic musical instrument 10A starts a second musical-instrument-specific data sending program from step A20, and in step A21 receives the musical-instrument-specific data request command. Subsequently, the user electronic musical instrument 10A reads musical-instrument-specific data from the flash memory 41*a* in step A22 and in step A23 transmits the read musical-instrument-specific data to the user computer 11.

Meanwhile, the user computer 11 receives the transmitted musical-instrument-specific data in step U22, and in step U23 transmits to the program distribution computer 24 a program update request command and the musical instrument ID contained in the received musical-instrument-specific data. In this case, the program update request command requests update of all the programs of the user electronic musical instrument 10A such as the OS program and the function programs. However, updating of specific types of programs may be requested through user's designation.

In response to transmission of the musical instrument ID and the program update request command, the program distribution computer 24 starts a first update program distribution program from step P10, and in step P11 receives the transmitted musical instrument ID and the program update request command. In subsequent step P12, the program distribution computer 24 transmits the musical instrument ID and a corresponding-data request command to the management computer 22. The corresponding-data request command requests retrieval from the management database 22*a* of data which represent the model number, OS version, function 1 version, function 2 version, etc., shipment date, plant name, and destination of the product corresponding to the musical instrument ID.

In response to transmission of the musical instrument ID and the corresponding-data request command, the management computer 22 starts a first search program from step M30, and in step M31 receives the transmitted musical instrument ID and corresponding-data request command. In step M32, the management computer 22 searches from the management database 22*a* a record whose musical instrument ID matches the received musical instrument ID and obtains from the record data which represent the model number, OS version, function 1 version, function 2 version, etc., shipment date, plant name, and destination of the product corresponding to the musical instrument ID. In step M33, the management computer 22 transmits to the program distribution computer 24 the obtained data corresponding to the musical instrument ID.

Meanwhile, in step P13 the program distribution computer 24 receives the transmitted data corresponding the musical instrument ID. In subsequent step P14, the program distribution computer 24 selects update programs corresponding to the received data. In this case, on the basis of the data corresponding to the musical instrument ID; i.e., data representing the model number, OS version, function 1 version, function 2 version, etc., shipment date, plant name, and destination of the product, the program distribution computer 24 selects update programs which match the user electronic musical instrument 10A and which are to be used for updating all the programs of the user electronic musical instrument 10A which require update. Notably, when a specific program to be updated is designated as described above, a condition indicating that the designated program is to be updated is added to the conditions for selecting update programs, and selection of update programs is performed under these conditions. In step P15, the program distribution computer 24 transmits the selected update program to the user computer 11.

Meanwhile, the user computer 11 receives the transmitted update programs in step U24 and executes update programs in step U25. Upon execution of the update programs, the user computer 11 transmits update instructions to the user electronic musical instrument 10A. In accordance with the transmitted update instructions, in step A24 the user electronic musical instrument 10A overwrites a portion or the entirety of the various programs, such as OS program and function programs, stored in the external storage unit 41 to thereby update the various programs of the user electronic musical instrument 10A. After completion of the processing in step U25, in step U26 the user computer 11 ends the update program. Further, after completion of the processing in step A24, in step A25 the user electronic musical instrument 10A ends the second musical-instrument-specific data sending program.

Notably, instead of updating the various programs of the user electronic musical instrument 10A through execution of the update program by the user computer 11, the various programs of the user electronic musical instrument 10A may be updated by causing the user electronic musical instrument 10A to execute the update programs. In this case, the user computer 11 transfers the update programs received from the program distribution computer 24 to the user electronic musical instrument 10A via the computer interface circuit 45 or the external storage unit (flexible disk FD, compact disk CD, or the like) 41. Subsequently, the user electronic musical instrument 10A itself performs the transferred update programs in order to update the various programs in the user electronic musical instrument 10A.

Meanwhile, after completion of the processing in step P15, in step P16 the program distribution computer 24 transmits an update request command to the management computer 22 in order to update the version data (data representing the OS version, function 1 version, function 2 version, etc.) corresponding to the musical instrument ID and stored in the management database 22*a* to match the versions of the update programs selected in step P14. In step P17, the program distribution computer 24 ends the first update program distribution program.

In step M34, the management computer 22 receives the transmitted update request command and updates the version data stored in the management database 22*a* and corresponding to the musical instrument ID in accordance with the update request command. In subsequent step M35, the management computer 22 ends the first search program.

As described above, the program distribution computer 24 distributes update programs suitable for the user electronic musical instrument 10A to the user computer 11 on the basis of the musical-instrument-specific data corresponding to the musical instrument ID received from the user electronic musical instrument 10A. Therefore, distribution of improper update programs to the user computer 11 can be prevented.

Next, there will be described an operation in which the user downloads various content items to the user electronic musical instrument 10A by use of the user computer 11.

Figure 7:
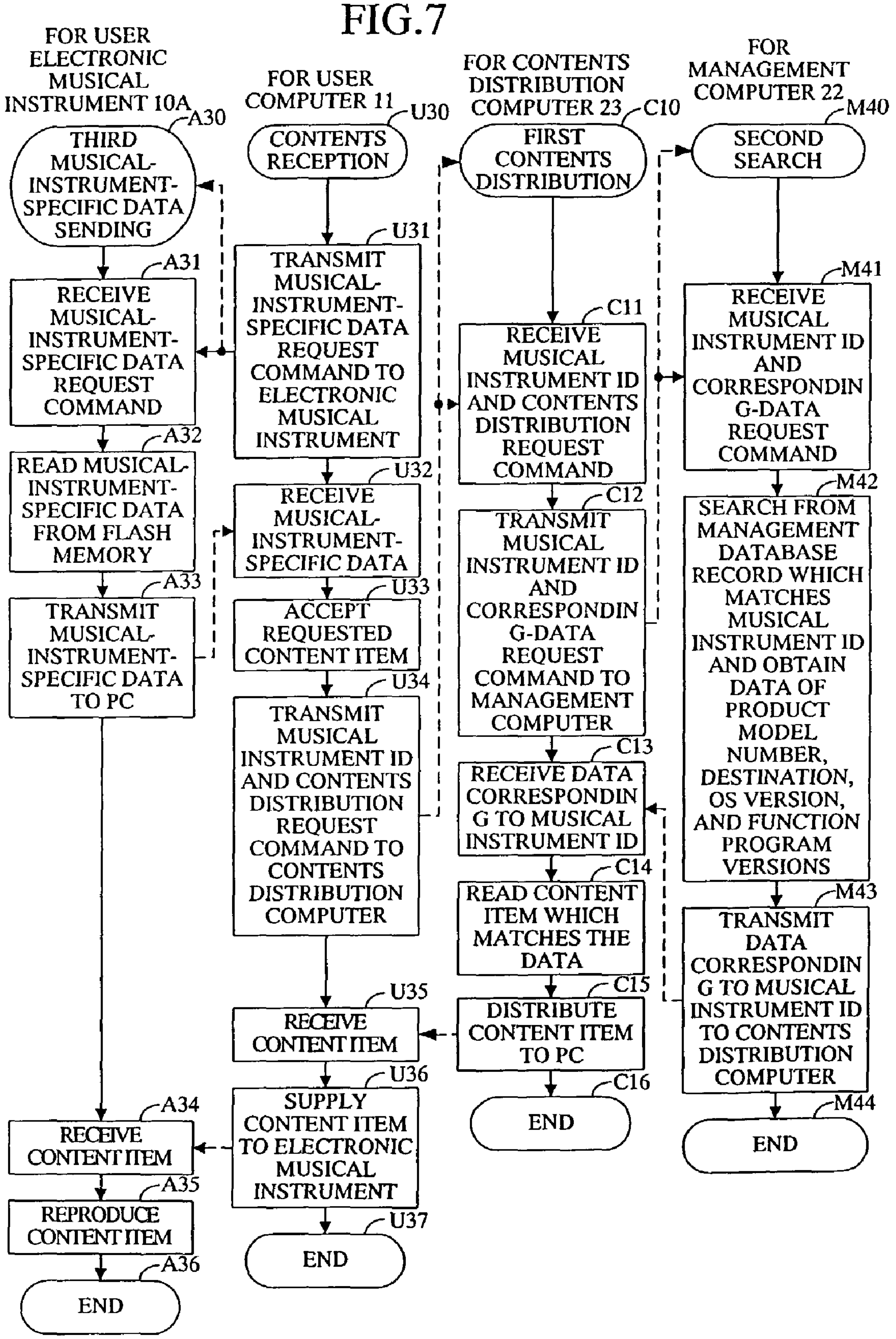
FIG. 7 is a flowchart showing a third musical-instrument-specific data sending program executed by the user electronic musical instrument, a contents reception program executed by the user computer, a first contents distribution program executed by the contents distribution computer, and a second search program executed by the management computer.

In this case, the user causes the user computer 11 to execute a contents reception program shown in FIG. 7. After start of the contents reception program from step U30, in step U31 the user computer 11 transmits a musical-instrument-specific data request command to the user electronic musical instrument 10A.

In response to transmission of the musical-instrument-specific data request command, the user electronic musical instrument 10A starts a third musical-instrument-specific data sending program from step A30, and transmits the musical-instrument-specific data stored in the flash memory 41*a* to the user computer 11 by means of the processing in steps A31 to A33, which is similar to that in steps A21 to A23 of FIG. 6.

Meanwhile, in step U32 the user computer 11 receives the transmitted musical-instrument-specific data. In subsequent step U33, the user computer 11 accepts a content item which the user requests. Specifically, while viewing the display of the user computer 11, the user designates a desired content item by use of the keyboard. In subsequent step U34, the user computer 11 transmits to the contents distribution computer 23 the musical instrument ID contained in the received musical-instrument-specific data and a contents distribution request command which represents request of a content item designated by the user.

In response to transmission of the musical instrument ID and the contents distribution request command, the contents distribution computer 23 starts a first contents distribution program from step C10, and in step C11 receives the transmitted musical instrument ID and the contents distribution request command. In subsequent step C12, the contents distribution computer 23 transmits the musical instrument ID and a corresponding-data request command to the management computer 22. In this case as well, the corresponding-data request command requests retrieval from the management database 22*a* of data which represent the model number, OS version, function 1 version, function 2 version, etc., shipment date, plant name, and destination of the product corresponding to the musical instrument ID.

In response to transmission of the musical instrument ID and the corresponding-data request command, the management computer 22 starts a second search program from step M40 and performs the processing in steps M41 to M43, which is similar to that in steps M31 to M33 of FIG. 6. As a result of the processing in steps M41 to M43, in the same manner as described above, the management computer 22 obtains from the management database 22*a* data which represent the model number, OS version, function 1 version, function 2 version, etc., shipment date, plant name, and destination of the product corresponding to the musical instrument ID, and transmits to the contents distribution computer 23 the obtained data corresponding the musical instrument ID. In subsequent step M44, the management computer 22 ends the second search program.

Meanwhile, in step C13 the contents distribution computer 23 receives the transmitted data corresponding the musical instrument ID. In subsequent step C14, the contents distribution computer 23 selects from the contents database 23*a* a content item which corresponds to the received data and is designated by the user. Specifically, the contents distribution computer 23 selects a content item which is designated by the user and which matches the user electronic musical instrument 10A, on the basis of the data corresponding to the musical instrument ID; i.e., data representing the model number, OS version, function 1 version, function 2 version, etc., shipment date, plant name, and destination of the product. In subsequent step C15, the contents distribution computer 23 transmits the selected update program to the user computer 11. The contents distribution computer 23 then ends the first contents distribution program in step C16.

Meanwhile, in step U35 the user computer 11 receives the transmitted content item and in step U36 the user computer 11 transmits the received content item to the user electronic musical instrument 10A. In subsequent step U37, the user computer 11 ends the contents reception program.

In step A34, the user electronic musical instrument 10A receives the transmitted content item and stores it in, for example, the hard disk of the external storage unit 41. In step A35, the user electronic musical instrument 10A reproduces the received content item. When the content item is an image, the image is displayed on the display 35 of the user electronic musical instrument 10A. When the content item is a piece of music, the tone signal generator 42 is caused to generate tones corresponding to the piece of music. Therefore, the user can check the downloaded content item. After completion of the processing in step A35, the user electronic musical instrument 10A ends the musical-instrument-specific data sending program in step A36.

As described above, the contents distribution computer 23 distributes a content item suitable for the user electronic musical instrument 10A to the user electronic musical instrument 10A on the basis of the musical-instrument-specific data corresponding to the musical instrument ID received from the user electronic musical instrument 10A. Therefore, distribution of improper content items to the user computer 11 can be prevented.

Next, there will be described an operation in which the user registers user information in the management database by use of the user portable communication terminal 12. That is, user registration in relation to the user electronic musical instrument 10B of FIG. 1 will be described.

Figure 8:
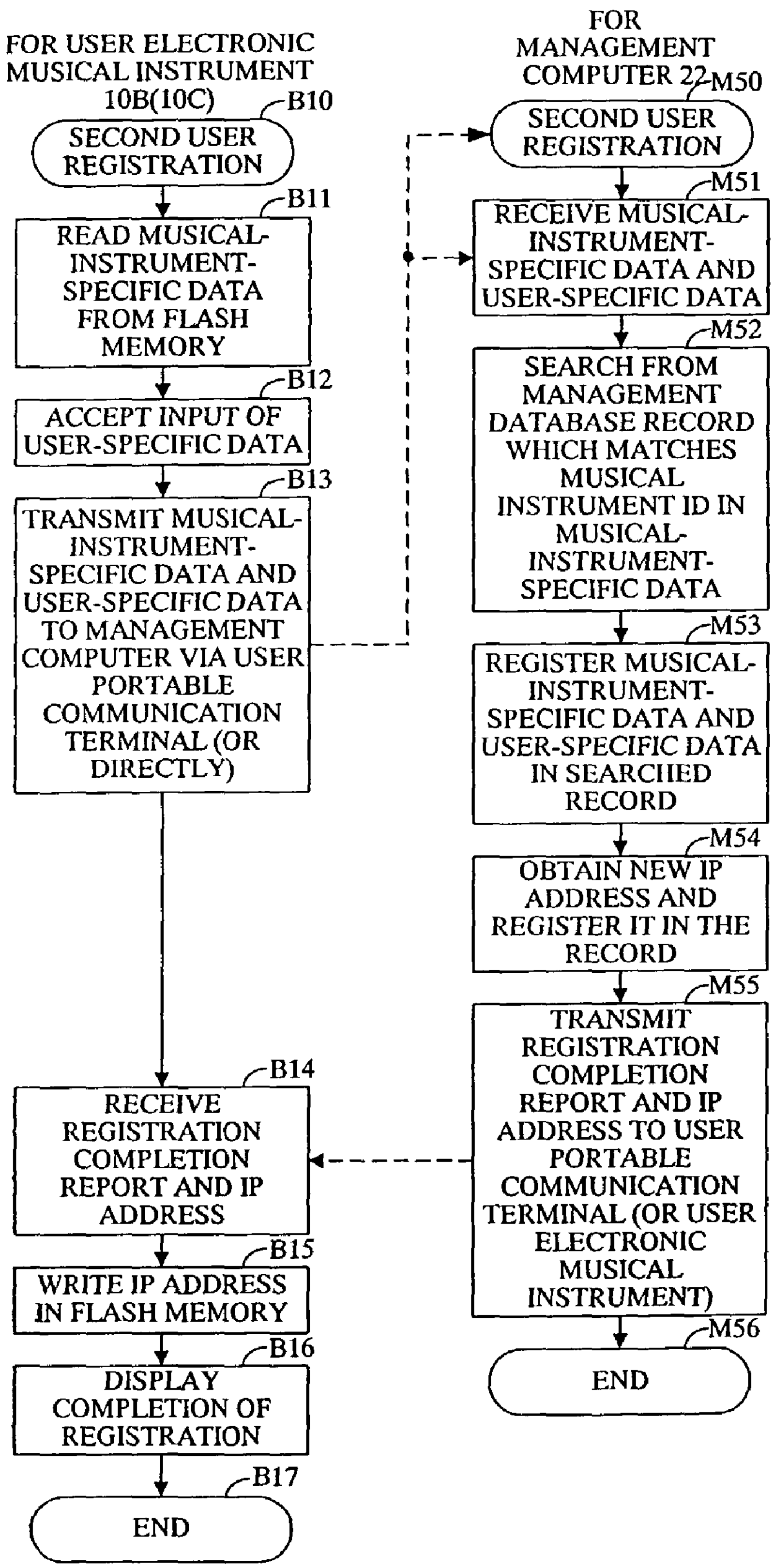
FIG. 8 is a flowchart showing a second user registration program executed by the user electronic musical instrument, and a second user registration program executed by the management computer.

In this case, the user causes the user electronic musical instrument 10B to execute a second user registration program shown in FIG. 8. After start of the second user registration program from step B10, in step B11 the user electronic musical instrument 10B reads musical-instrument-specific data from the flash memory 41*a*. In actuality, the program for the user electronic musical instrument 10B is executed by the CPU 37 contained in the user electronic musical instrument 10B. However, in order to simplify the description, the program is considered to be executed by the user electronic musical instrument 10B in the following description.

In subsequent step B12, the user electronic musical instrument 10B accepts input of user-specific data. While viewing the display 35 of the user electronic musical instrument 10B, the user operates the panel controllers 32 in order to input user-specific data consisting of the name, address, phone number, and electronic-mail address of the user. In step B13, the user electronic musical instrument 10B transmits the read-out musical-instrument-specific data and the input user-specific data to the user portable communication terminal 12. The user portable communication terminal 12 wireless-transmits to the relay station 13 a signal representing the musical-instrument-specific data and the user-specific data. Upon reception of the signal representing the musical-instrument-specific data and the user-specific data, the relay station 13 transmits the musical-instrument-specific data and the user-specific data to the management computer 22 via the network 20. During the communications for user registration, a temporary IP address for user registration is used.

In response to transmission of the musical-instrument-specific data and the user-specific data, the management computer 22 starts a second user registration program from step M50, and in step M51 receives the musical-instrument-specific data and the user-specific data. Subsequently, through the processing in steps M52 to M54, which is similar to that in steps M22 to M24 of FIG. 5, the management computer 22 registers the received musical-instrument-specific data and user-specific data in a record whose musical instrument ID matches that contained in the musical-instrument-specific data. Subsequently, the management computer 22 obtains a new IP address and registers it in the record. In subsequent step M55, the management computer 22 transmits a user registration completion report and the IP address to the user portable communication terminal 12 via the network 20 and the relay station 13. Subsequently, in step M56 the management computer 22 ends the second user registration program.

The user portable communication terminal 12 receives the transmitted user registration completion report and IP address and transmits them to the user electronic musical instrument 10B. Meanwhile, in step B14 the user electronic musical instrument 10B receives the transmitted user registration completion report and IP address. In subsequent step B15, the user electronic musical instrument 10B writes the received IP address in the flash memory 41*a*. The user electronic musical instrument 10B displays completion of registration of the IP address on the display 25 in subsequent step B16, and ends the second user registration program in step B17.

As described above, for user registration, the user is required only to transmit via the user portable communication terminal 12 to the management computer 22 the user-specific data together with the musical-instrument-specific data, including the musical instrument ID, stored in the flash memory and is not required to input the stored musical-instrument-specific data, including the musical instrument ID. Therefore, user registration can be performed simply. Moreover, an accident in which the user transmits musical-instrument-specific data containing an erroneous musical instrument ID to the management computer 22 can be avoided, and user registration can be performed accurately.

Next, there will be described an operation in which the user updates the OS program or the function programs of the user electronic musical instrument 10B via the user portable communication terminal 12.

Figure 9:
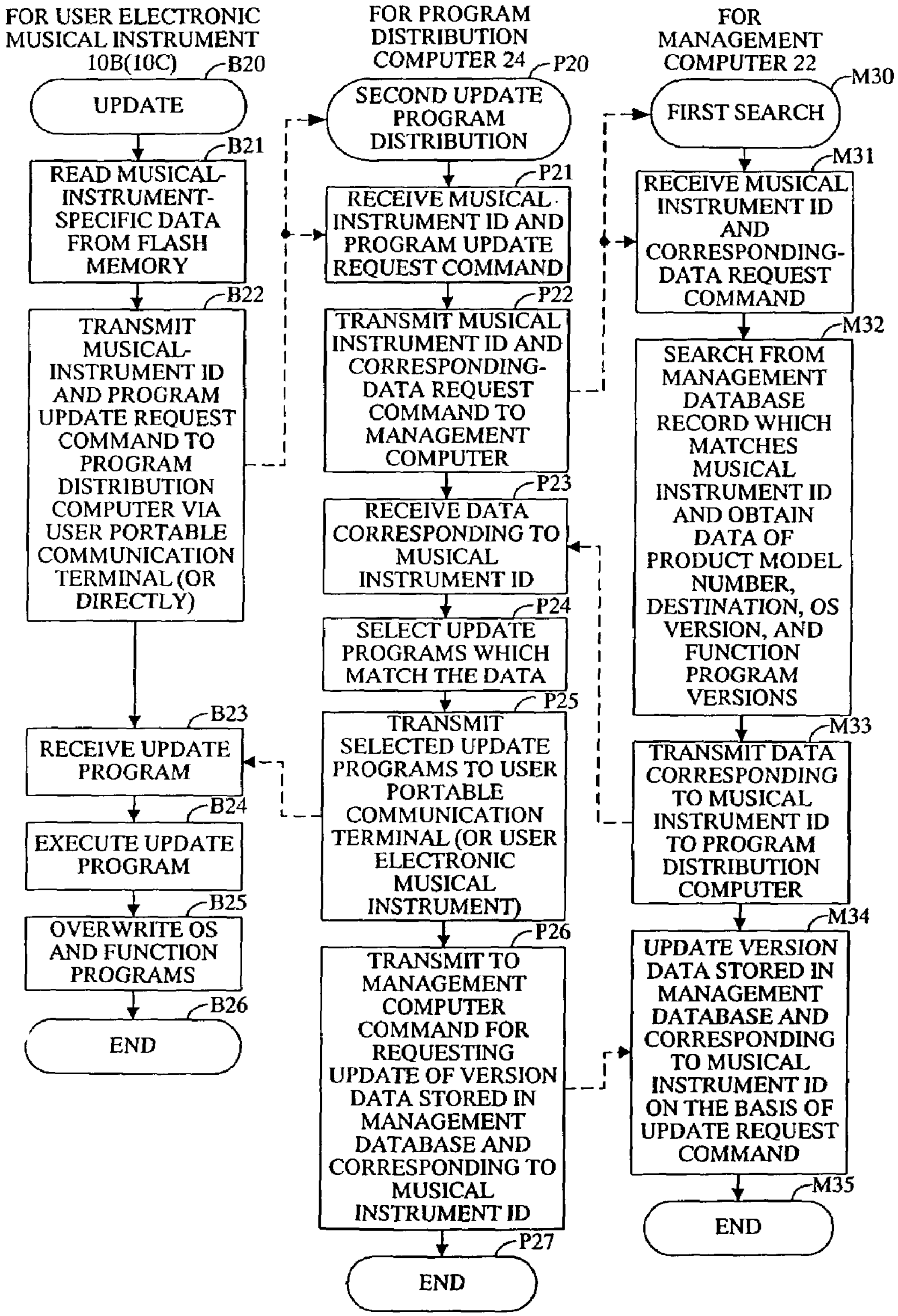
FIG. 9 is a flowchart showing an update program executed by the user electronic musical instrument, a second update program distribution program executed by the program distribution computer, and a first search program executed by the management computer.

In this case, the user causes the user electronic musical instrument 10B to execute an update program shown in FIG. 9. After start of the update program from step B20, in step B21 the user electronic musical instrument 10B reads musical-instrument-specific data from the flash memory 41*a*. In subsequent step B22, the user electronic musical instrument 10B transmits the read musical-instrument-specific data and a program update request command to the program distribution computer 24 via the user portable communication terminal 12, the relay station 13, and the network 20. The program update request command request command is the same as that employed in the above-described case in which the user computer 11 is used. However, the communications for update operation is performed by use of an IP address allotted to the user electronic musical instrument 10B.

In response to transmission of the musical instrument ID and the program update request command, the program distribution computer 24 starts a second update program distribution program from step P20. The processing in steps P21 to P27 of the second update program distribution program is substantially the same as that in steps P11 to P17 of the first update program distribution program of FIG. 6, except for the following point. In the processing in step P15 of FIG. 6, the selected update program is transmitted to the user computer 11. By contrast, in the processing in step P25 of the second update program distribution program, the selected update program is transmitted to the user electronic musical instrument 10B via the user portable communication terminal 12. Further, in response to transmission of the musical instrument ID and the corresponding-data request command to the management computer 22 in step P22, the management computer 22 starts the first search program shown in FIG. 6.

As a result, as in the above-described case in which the user computer 11 is used, the update program selected to match the user electronic musical instrument 10B is transmitted from the program distribution computer 24 to the user electronic musical instrument 10B. The user electronic musical instrument 10B receives the transmitted update programs in step B23 and executes the received update programs in step B24. As a result, the OS program and the function programs are overwritten in step B25, whereby the various programs in the user electronic musical instrument 10B are updated. After completion of the processing in step B25, the user electronic musical instrument 10B ends the update program.

As described above, the program distribution computer 24 distributes update program suitable for the user electronic musical instrument 10B to the user electronic musical instrument 10B on the basis of the musical-instrument-specific data corresponding to the musical instrument ID received from the user electronic musical instrument 10B. Therefore, distribution of improper update programs to the user electronic musical instrument 10B can be prevented.

Next, there will be described an operation in which the user downloads various content items to the user electronic musical instrument 10B via the user portable communication terminal 12.

Figure 10:
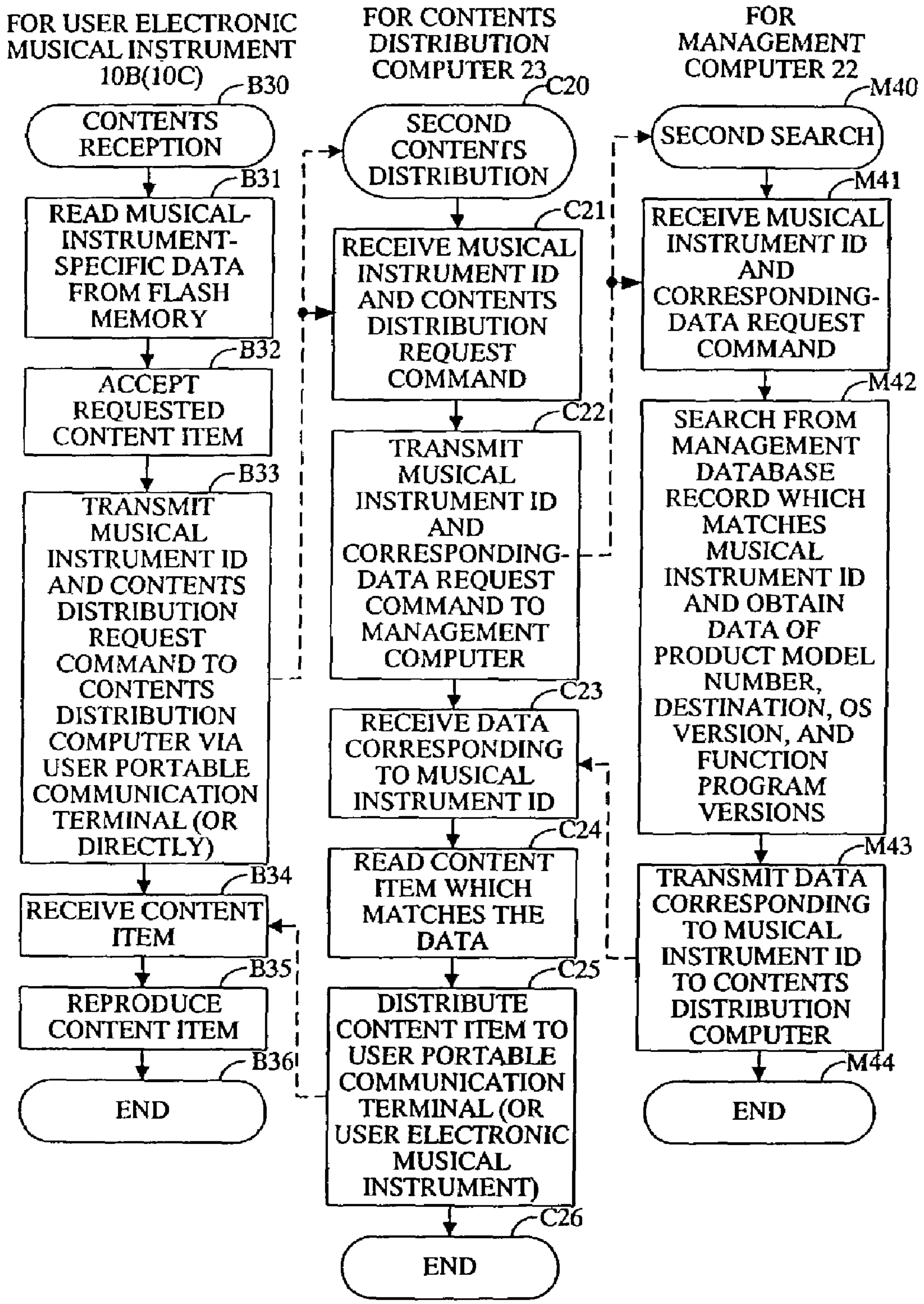
FIG. 10 is a flowchart showing a contents reception program executed by the user electronic musical instrument, a second contents distribution program executed by the contents distribution computer, and a second search program executed by the management computer.

In this case, the user causes the user electronic musical instrument 10B to execute a contents reception program shown in FIG. 10. After start of the contents reception program from step B30, in step B31 the user electronic musical instrument 10B reads the musical-instrument-specific data stored in the flash memory 41*a*. In subsequent step B32, the user electronic musical instrument 10B accepts a content item which the user requests, as in the case of step U33 of FIG. 7. In subsequent step B33, the user electronic musical instrument 10B transmits to the contents distribution computer 23, via the user portable communication terminal 12, the musical instrument ID contained in the read-out musical-instrument-specific data and a contents distribution request command which represents request of a content item designated by the user.

In response to transmission of the musical instrument ID and the contents distribution request command, the contents distribution computer 23 starts a second contents distribution program from step C20. The processing in steps C21 to C26 of the second contents distribution program is substantially the same as that in steps C11 to C16 of the first contents distribution program of FIG. 7, except for the following point. In the processing in step C15 of FIG. 7, the selected content item is transmitted to the user computer 11. By contrast, in the processing in step C25 of the second contents distribution program, the selected content item is transmitted to the user electronic musical instrument 10B via the user portable communication terminal 12. Further, in response to transmission of the musical instrument ID and the corresponding-data request command to the management computer 22 in step C22, the management computer 22 executes the second search program shown in FIG. 7.

As a result, as in the above-described case in which the user computer 11 is used, the content item selected to match the user electronic musical instrument 10B is transmitted from the contents distribution computer 23 to the user electronic musical instrument 10B. In step B34, the user electronic musical instrument 10B receives the transmitted content item and stores it in, for example, the hard disk of the external storage unit 41. In step B35, the user electronic musical instrument 10B reproduces the received content item. When the content item is an image, the image is displayed on the display 35 of the user electronic musical instrument 10B. When the content item is a piece of music, the tone signal generator 42 is caused to generate tones corresponding to the piece of music. Therefore, the user can check the downloaded content item. After completion of the processing in step B35, in step B36 the user electronic musical instrument 10B ends the musical-instrument-specific data sending program.

As described above, the contents distribution computer 23 distributes a content item suitable for the user electronic musical instrument 10B to the user electronic musical instrument 10B on the basis of the musical-instrument-specific data corresponding to the musical instrument ID received from the user electronic musical instrument 10B. Therefore, distribution of improper content items to the user electronic musical instrument 10B can be prevented.

Next, registration of user information in relation to the user electronic musical instrument 10C shown in FIG. 1 will be described. In this case as well, the corresponding programs shown in FIG. 8 are executed by the user electronic musical instrument 10C and the management computer 22, respectively.

In this case, the user electronic musical instrument 10C is connected directly to the network 20, and communicates directly with the management computer 22. Therefore, as shown in parentheses in step B13 of FIG. 8, the user electronic musical instrument 10C transmits musical-instrument-specific data and user-specific data directly to the management computer 22 via the network 20. Further, as shown in the parentheses in step M55 of FIG. 8, the management computer 22 transmits a user registration completion report and an IP address directly to the user electronic musical instrument 10C via the network 20. The processing in the remaining steps of FIG. 8 is the same as that in the above-described case for the user electronic musical instrument 10B.

Next, there will be described an operation in which the user updates the OS program or function programs of the user electronic musical instrument 10C. In this case as well, the corresponding programs shown in FIG. 9 are executed by the user electronic musical instrument 10C, the program distribution computer 24, and the management computer 22, respectively.

As described above, the user electronic musical instrument 10C is connected directly to the network 20, and communicates directly with the management computer 22. Therefore, as shown in parentheses in step B22 of FIG. 9, the user electronic musical instrument 10C transmits musical-instrument-specific data and a program update request command directly to the program distribution computer 24 via the network 20. Further, as shown in parentheses in step P25 of FIG. 9, the program distribution computer 24 transmits selected update programs directly to the user electronic musical instrument 10C via the network 20. The processing in the remaining steps of FIG. 9 is the same as that in the above-described case for the user electronic musical instrument 10B.

Next, there will be described an operation in which the user downloads various content items to the user electronic musical instrument 10C. In this case as well, the corresponding programs shown in FIG. 10 are executed by the user electronic musical instrument 10C, the contents distribution computer 23, and the management computer 22, respectively.

As described above, the user electronic musical instrument 10C is connected directly to the network 20, and communicates directly with the management computer 22. Therefore, as shown in parentheses in step B33 of FIG. 10, the user electronic musical instrument 10C transmits musical-instrument-specific data and a content distribution request command directly to the contents distribution computer 23 via the network 20. Further, as shown in parentheses in step C25 of FIG. 10, the contents distribution computer 23 transmits a selected content item to the user electronic musical instrument 10C via the network 20. The processing in the remaining steps of FIG. 10 is the same as that in the above-described case for the user electronic musical instrument 10B.

As described above, as in the case of the user electronic musical instrument 10B, user registration in relation to the user electronic musical instrument 10C can be performed simply without possibility of the user transmitting erroneous musical instrument ID to the management computer 22. Moreover, distribution of improper update programs and content items to the user electronic musical instrument 10C can be prevented.

In the above-described embodiment, when a program or content item is distributed from the program distribution computer 24 or the contents distribution computer 23 to the user electronic musical instrument 10A via the user computer 11, to the user electronic musical instrument 10B via the user portable communication terminal 12, or directly to the user electronic musical instrument 10C, the program distribution computer 24 or the contents distribution computer 23 may embed in the program or content item to be distributed a musical instrument ID for specifying the user electronic musical instrument 10A, 10B, or 10C and distribute the program or content item containing the musical instrument ID to the electronic musical instruments 10A, 10B, and 10C, to thereby enable only a specified user electronic musical instrument 10A, 10B, or 10C to use the distributed program or content item.

Specifically, the program distribution computer 24 embeds a musical instrument ID in an update program(s) selected in step P14 of FIG. 6 or in step P24 of FIG. 9 and in step P15 or P25 distributes the update program(s) to the user electronic musical instrument 10A via the user computer 11, to the user electronic musical instrument 10B via the user portable communication terminal 12, or directly to the user electronic musical instrument 10C. The contents distribution computer 23 embeds a musical instrument ID in a content item selected in step C14 of FIG. 7 or in step C24 of FIG. 10 and in step C15 or C25 distributes the content item to the user electronic musical instrument 10A via the user computer 11, to the user electronic musical instrument 10B via the user portable communication terminal 12, or directly to the user electronic musical instrument 10C. The musical instrument ID maybe embedded directly, or in the form of electronic watermark, in the program(s) or content item at a predetermined position thereof.

The user computer 11 receives the program(s) or content item containing the musical instrument ID in step U24 of FIG. 6 or in step U35 of FIG. 7. The user electronic musical instrument 10A, 10B, or 10C receives the program(s) or content item containing the musical instrument ID in step A34 of FIG. 7, in step B23 of FIG. 9, or in step B34 of FIG. 10. Subsequently, the user computer 11 or the user electronic musical instrument 10A, 10B, or 10C compares the embedded musical instrument ID with the musical instrument ID held thereby, and only when both the IDs are the same, the user computer 11 or the user electronic musical instrument 10A, 10B, or 10C executes the program(s) or reproduces the content item. Thus, it becomes possible to prevent illegal use of programs and content items and to specify the origin of illegally distributed program or content item.

Moreover, an encryption technique which uses a musical instrument ID as key information may be employed. In this case, the program distribution computer 24 or the contents distribution computer 23 encrypts the above-described program(s) or content item by use of a corresponding musical instrument ID and transmits the encrypted program(s) or content item. The user computer 11 or the user electronic musical instrument 10A, 10B, or 10C decrypts the distributed program(s) or content item by use of the musical instrument ID as key information.

In the above-described embodiment, not only a musical instrument ID but also various data which represent the model number, OS version, function 1 version, function 2 version, etc., shipment date, plant name, destination, etc. of a product are stored as musical-instrument-specific data in the flash memory 41*a* of the user electronic musical instrument 10A-10C. However, the embodiment may be modified in such a manner that only a musical instrument ID is stored in the flash memory 41*a* of the user electronic musical instrument 10A-10C, and the remaining musical-instrument-specific data are stored in the management database 22*a* of the management computer 22. In this case, the remaining musical-instrument-specific data are preferably stored in the management database 22*a* at an appropriate timing before shipment of the user electronic musical instrument 10A-10C. For example, when a corresponding musical instrument ID is stored in the flash memory 41*a* of the user electronic musical instrument 10A-10C, registration of the remaining musical-instrument-specific data in the management database 22*a* is performed concurrently. Alternatively, each musical instrument ID and the remaining musical-instrument-specific data to be paired therewith may be stored in a database provided in the plant computer 21. In this case, in the course of user registration, a musical instrument ID is compared with musical instrument IDs stored in the database provided in the plant computer 21, and the remaining musical-instrument-specific data corresponding to the musical instrument ID are retrieved from the database and registered in the management database 22*a* of the management computer 22.

In the above-described embodiment, since a network ID (e.g., IP address) unique to a musical instrument is provided in the course of user registration over the network 20, the location of the musical instrument on the network 20 can be specified. This is effective for distribution of programs and content items or for a session of a plurality of electronic musical instruments. Notably, an IP address is not required to be provided at the time of user registration and may be provided at the time of shipment from the plant. For example, in the program processing of FIG. 4, an IP address may be obtained simultaneously with obtainment of a new musical instrument ID and written into an electronic musical instrument when musical-instrument-specific data are written therein. In this case, it becomes unnecessary to provide a temporary address when the user electronic musical instrument 10A establishes a connection with the network 20 directly or via the user portable communication terminal 12 and performs user registration, as shown in FIG. 8.

A common serial number may be allotted to a plurality of model numbers as a musical instrument ID, or a different serial number may be allotted to each model number as a musical instrument ID. The serial number is not required to consist of numerals only, and may consist of alphabetical letters or of numerals and alphabetical letters.

In the above-described embodiment, the management computer 22, the contents distribution computer 23, and the program distribution computer 24 are provided separately. However, these computers 22, 23, and 24 may be integrated into a single computer. Specifically, the management computer 22 is programmed to have a contents distribution function and a program distribution function which are similar to those described in the above-described embodiment and to provide content items and programs in accordance with requests from users. Further, the management computer 22, the contents distribution computer 23, and the program distribution computer 24 may be connected by use of a dedicated communication line without being connected to an open network such as the Internet.

In the above-described embodiment, the present invention is applied to the user electronic musical instruments 10A to 10C having keyboards. However, the present invention can be applied widely to various types of electronic music apparatuses, such as an electronic music apparatus capable of generating tone signals and an electronic music apparatus capable of imparting musical effects to tone signals. Examples of such electronic music apparatuses include electronic musical instruments having playing controllers other than keyboards; tone signal generators not equipped with playing controllers; sequencers (automatic playing units); samplers; apparatuses capable of generating tone signals such as karaoke apparatuses and personal computers having tone signal generators; and apparatuses capable of imparting musical effects to tone signals such as mixers, recorders, and effectors.

Obviously, numerous modifications and variations of the present invention are possible in light of the above teachings. It is therefore to be understood that within the scope of the appended claims, the present invention may be practiced otherwise than as specifically described herein.

What is claimed is:

1. An electronic musical instrument system, comprising:

an electronic musical instrument; and a management computer capable of communicating with the electronic musical instrument via a network, wherein the electronic musical instrument stores unique identification data and other instrument specific data relating to the electronic musical instrument in a memory unit of the electronic musical instrument at a manufacturing plant before shipment thereof, and the unique identification data and other instrument specific data are transmitted to the management computer via the network so as to register a user of the electronic musical instrument;

said management computer capable of obtaining an IP address for an electronic music instrument and transmitting the IP address to said electronic musical instrument;

said electronic musical instrument capable of registering the transmitted IP address in the electronic musical instrument.

2. An electronic musical instrument system according to claim 1, further comprising a user computer which is connected between the electronic musical instrument and the network to perform transmission of the unique identification data from the electronic musical instrument to the management computer.

3. An electronic musical instrument system according to claim 1, wherein transmission of the unique identification data from the electronic musical instrument to the network is performed via a portable communication terminal.

4. An electronic musical instrument system according to claim 1, wherein the electronic musical instrument is connected directly to the network.

5. An electronic musical instrument system according to claim 1, wherein user specific data relating to the user is transmitted to the management computer in addition to the unique identification data when the user is registered.

6. An electronic musical instrument system according to claim 1, wherein the unique identification data is used for distribution to the electronic musical instrument of a program or content item which matches the electronic musical instrument.

7. An electronic musical instrument system according to claim 6, wherein the management computer further has a database for storing programs or content items to be distributed to the electronic musical instrument.

8. An electronic musical instrument system according to claim 6, further comprising a distribution computer which has a database for storing programs or content items and is connected to the network in order to distribute the program or content item to the electronic musical instrument.

9. An electronic musical instrument system according to claim 6, wherein the unique identification data is embedded in the program or content item distributed to the electronic musical instrument.

10. An electronic musical instrument which is communicatably connected to a management computer via a network, the electronic musical instrument comprising a memory for storing unique identification data and other instrument specific data relating to the electronic musical instrument in a memory unit of the electronic musical instrument at a manufacturing plant before shipment thereof, and transmitting the unique identification data and the other instrument specific data to the management computer via the network so as to register a user of the electronic musical instrument;

said electronic musical instrument capable of storing in the electronic musical instrument an IP address transmitted to it by the management computer.

11. An electronic musical instrument according to claim 10, wherein the unique identification data is used for distribution to the electronic musical instrument of a program or content item which matches the electronic musical instrument.

12. A system for communicating with an electronic musical instrument via a network, comprising:

a management computer adapted to receive via the network unique identification data and other instrument specific data relating to the electronic musical instrument previously stored in the electronic musical instrument at a manufacturing plant before shipment thereof;

the management computer further adapted to register a user of the electronic musical instrument by use of the received unique identification data and the other instrument specific data;

said management computer capable of obtaining an IP address for an electronic music instrument and transmitting the IP address to the electronic musical instrument so that the electronic musical instrument can register the IP address in the electronic musical instrument.

13. A system for communicating with a management computer via a network and with an electronic musical instrument, comprising:

a user computer adapted to receive unique identification data and other instrument specific data relating to the electronic musical instrument previously stored in the electronic musical instrument at a manufacturing plant before shipment thereof and to transmit said identification data and the other instrument specific data to the management computer so as to register a user of the electronic musical instrument;

said user computer further adapted to receive an IP address obtained and sent by the management computer and to transmit the IP address to the electronic musical instrument so that the electronic musical instrument can register the IP address in the electronic musical instrument.

14. A distribution computer which is communicatably connected to a management computer and communicatably connected to an electronic musical instrument via a network, the distribution computer comprising:

a database for storing programs or content items to be distributed to the electronic musical instrument; and a distribution control section for selecting a program or content item which matches the electronic musical instrument from the programs or content items stored in the database, by use of unique identification data and other instrument specific data relating to the electronic musical instrument previously stored in the electronic musical instrument and transmitted to the management computer, and for distributing the selected program or content item to the electronic musical instrument;

said distribution control section adapted for obtaining an IP address from the management computer and for transmitting the IP address to the electronic musical instrument.

15. A computer-readable media for storing in memory of an electronic musical instrument communicatably connected to a management computer via a network, comprising:

computer-readable media instructions for causing the electronic musical instrument to transmit unique identification data and other instrument specific data relating to the electronic musical instrument previously stored in a memory at a manufacturing plant before shipment thereof to the management computer via the network, so as to register a user of the electronic musical instrument; and computer-readable media instructions for causing the electronic music to obtain an IP address from the management computer and to store the IP address in the electronic musical instrument.

16. A computer-readable media for storing in memory of a management computer which is communicatably connected to an electronic musical instrument via a network, comprising:

computer-readable media instructions for causing the management computer to receive unique identification data and other instrument specific data relating to the electronic musical instrument previously stored in a memory at a manufacturing plant before shipment thereof to the management computer via the network, and to register a user of the electronic musical instrument by use of the received identification data and the other apparatus specific data; and computer-readable media instructions for causing the management computer to obtain an IP address for an electronic music instrument and to transmit the IP address to said electronic musical instrument.

17. A computer-readable media for storing in memory of a user computer which is communicatably connected to a management computer via a network and to an electronic musical instrument, comprising:

computer-readable media instructions for causing the user computer to receive unique identification data and other instrument specific data relating to the electronic musical instrument previously stored in a memory of the electronic musical instrument at a manufacturing plant before shipment thereof and to transmit said identification data and the other instrument specific data to the management computer via the network, so as to register a user of the electronic musical instrument; and computer-readable media instructions for causing the user computer to receive an IP address obtained and sent by the management computer and to transmit the IP address to the electronic musical instrument so that the electronic musical instrument can register the IP address in the electronic musical instrument.

18. A computer-readable media for storing in a distribution computer which is communicatably connected to a management computer and communicatably to an electronic musical instrument via a network, comprising:

computer-readable media instructions for causing the distribution computer to select from a database at least one program or content item which matches the electronic musical instrument based on unique identification data and other instrument specific data relating to the electronic musical instrument previously stored in the electronic musical instrument at a manufacturing plant before shipment thereof and transmitted to the management computer, and computer-readable media instructions for distributing said selected program or content item to the electronic musical instrument, and computer-readable media instructions for causing the distribution computer to obtain an IP address from the management computer and to transmit the IP address to the electronic musical instrument.

19. The distribution computer of claim 14 wherein the distribution control section is further operable to transmit version data for the selected program to the management computer, where the management computer includes a database for storing the version data.

20. The computer-readable media of claim 18 further comprises computer-readable media instruction for transmitting version data for the selected computer-readable media to the management computer, where the management computer includes a database for storing the version data.

21. An electronic musical instrument system, comprising:

an electronic musical instrument having unique identification data stored in advance therein;

a management computer having a record area corresponding to the unique identification data, the electronic musical instrument capable of communicating the unique identification data via a network to the management computer and the management computer operable to store other information received from the electronic musical instrument in the record area based on the unique identification data received from the electronic musical instrument;

said management computer capable of obtaining an IP address for an electronic music instrument and transmitting the IP address to said electronic musical instrument;

said electronic musical instrument capable of registering the transmitted IP address in the electronic musical instrument.

22. A system for communicating with an electronic musical instrument via a network, comprising:

a management computer adapted to receive via network unique identification data previously stored in the electronic musical instrument and to register a user of the electronic musical instrument by use of the received unique identification data;

the management computer further having a record area corresponding to the unique identification data and operable to store other information received from the electronic musical instrument in the record area based on the unique identification data received from the electronic musical instrument;

said management computer capable of obtaining an IP address for an electronic music instrument and transmitting the IP address to said electronic musical instrument;

said electronic musical instrument capable of registering the transmitted IP address in the electronic musical instrument.

* * * * *